(12) United States Patent
Gomi

(10) Patent No.: US 7,985,946 B2
(45) Date of Patent: Jul. 26, 2011

(54) SOLID STATE IMAGING DEVICE IN DIGITAL CAMERA INCLUDING A CORRELATE DOUBLE SAMPLING CIRCUIT

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 277 days.

(21) Appl. No.: 12/400,104

(22) Filed: Mar. 9, 2009

(65) Prior Publication Data

US 2009/0224140 A1   Sep. 10, 2009

(30) Foreign Application Priority Data

Mar. 7, 2008   (JP) .................................. 2008-057519

(51) Int. Cl.
*H01L 27/00* (2006.01)

(52) U.S. Cl. .................................. 250/208.1; 250/214 R

(58) Field of Classification Search ............... 250/208.1, 250/214 R; 348/294–312; 257/290–292
See application file for complete search history.

(56) References Cited

U.S. PATENT DOCUMENTS 7,612,320 B2 * 11/2009 Hagihara ................... 250/208.1

FOREIGN PATENT DOCUMENTS

JP        2000-287131 A    10/2000

* cited by examiner

*Primary Examiner* — Que T Le
(74) *Attorney, Agent, or Firm* — Westerman, Hattori, Daniels & Adrian, LLP

(57) ABSTRACT

A solid-state imaging device including: pixel section having two-dimensionally arranged pixels, each pixel containing photoelectric conversion device, charge retaining section, amplification section, and reset section controlled by reset control signal applied on control terminal, pixel section having vertical signal line and constant current supply; CDS circuit for outputting pixel signal corresponding to light signal by computing difference between first signal outputted from the pixel immediately after applying first potential to control terminal and second signal outputted from pixel corresponding to signal charges; and reset section control section taking potential of reset control signal at the time of cutting off connection between the one end and the other end of reset section as second potential, for applying third potential being intermediate potential between first potential and second potential to control terminal between a timing of outputting the first signal and a timing of outputting the second signal.

6 Claims, 11 Drawing Sheets

SOLID STATE IMAGING DEVICE IN DIGITAL CAMERA INCLUDING A CORRELATE DOUBLE SAMPLING CIRCUIT

This application claims benefit of Japanese Patent Application No. 2008-57519 filed in Japan on Mar. 7, 2008, the contents of which are incorporated by this reference.

BACKGROUND OF THE INVENTION

The present invention relates to solid-state imaging devices for use for example in a digital still camera, digital video camera, etc.

In recent years, performance of MOS solid-state imaging devices with which peripheral circuits can be formed into an on-chip system has been conspicuously improved and is spreading. As an amplification transistor is provided in each individual pixel of a MOS solid-state imaging device, a threshold variance of the amplification transistor from one pixel to another and kTC noise (thermal noise) at the time of reset are to cause fixed pattern noise and random noise in image. To remove these noises, CDS (correlated double sampling) operation is performed to read out only a light signal that becomes image signal by obtaining a difference between a reset level after reset and an output level after transfer of electric charges of pixel.

A description will be given below with respect to problems in the case where image is taken with using a MOS solid-state imaging device in which CDS operation is effected. When a very bright light source is reflected within an image taking region of the solid-state imaging device, an intense light is to impinge as result also on an input section of the amplification transistor of corresponding pixels. For this reason, a reset level output at the input section of the amplification transistor is changed for example due to a leak of accumulated electric charges whereby its dynamic range is suppressed. As a result, a phenomenon occurs at those pixels on which the intense light is incident that an output of image signal is lowered on the contrary by CDS operation (hereinafter referred to as "black sun phenomenon"). When for example an image of the sun is taken, an unnatural image is attained as a center portion of the sun results in a black dot. This problem can be solved in still pictures by providing a mechanical shutter. When taking a moving picture, however, use of the mechanical shutter at the same time is low in practicality as a means for solving the problem, since it becomes a serious demerit in securing the exposure time and/or frame rate.

Methods for suppressing the black sun phenomenon have been proposed for example in Japanese Patent Application Laid-Open 2000-287131. The one disclosed in the above publication proposes a method for suppressing the black sun phenomenon where change in output when outputting a reset level is detected so that, if it is determined as an occurrence of the black sun phenomenon, a predetermined value is written as a reset level output.

When an intense light is incident, however, its effect in some cases may also appear in an image region other than those pixels on which such intense light is incident. This will be referred to hereinafter as "transverse stripe phenomenon". A major factor in the occurrence of the transverse stripe phenomenon will now be described. FIG. 1 schematically shows construction of a prior-art MOS solid-state imaging device. In the MOS solid-state imaging device as shown in FIG. 1, an amplification circuit section 350 is provided between a pixel section 300 and a CDS circuit section 360 so as to amplify pixel signal before it is inputted to the CDS circuit section 360. It is thereby possible to achieve a higher S/N, since it can be made less likely to be affected by noise occurring at a signal output circuit section 370 after the CDS circuit section 360.

What are denoted by 301 to 303 each are a unit pixel cell within the pixel section 300, and these are two-dimensionally arranged. 304 is a constant current supply provided for each column, constituting a source follower amplifier in combination with a transistor for source follower located within the pixel cell 301 to 303. A common gate electric potential 307 is supplied to and a common power supply wiring 306 is connected to the constant current supplies 304. The signal of each pixel 301 to 303 is read out row by row onto an output signal line 308 and is outputted to the outside through the amplification circuit section 350, the CDS circuit section 360, and the signal output circuit section 370.

When an intense light is incident on the pixel 302 in this case, an amplification circuit within the amplification circuit section 350 provided for the column where such intense light is incident is saturated and is affected so that, for example, it departs from its operation range. In the case where the employed amplification circuit is for example a constant current type amplification circuit where circuit current is constant without depending on input amplitude of the amplification circuit, if the circuit is saturated so as to depart from its operation range, the constant current characteristic of the circuit current is deteriorated so that in some cases the current consumed at the amplification circuit section 350 as a whole is changed. Generally, the power supply and/or the GND line of the amplification circuits of the respective columns of the amplification circuit section 350 are connected in common. Therefore, when the constant current characteristic of one amplification circuit is deteriorated so as to change the current consumed at the amplification circuit section 350 as a whole, an electric potential of the power supply and/or GND line is sharply changed due to parasitic resistance of the power supply and/or GND line. Accordingly, when an intense light is incident so as to saturate the amplification circuit of one column within the amplification circuit section 350, the electric potential of the power supply and/or GND line is sharply changed and, as a result, the outputs of unsaturated amplification circuits of other columns are also sharply changed.

A description will be given below by way of FIG. 2 typically showing a taking of image of a window chart with respect to the manner of effect on image when such an sharp output change of the amplification circuit occurs. Referring to FIG. 2, 401 is dark or an output region where the amplification circuit is not saturated, corresponding to a pixel region of the pixel cells 301 in FIG. 1. A light in excess of that makes the amplification circuit saturated is incident on a region indicated by 402, which corresponds to the pixel indicated by the pixel cell 302 in FIG. 1. 403 is a region similar to the region 401 which is dark or where a light of the degree by which the amplification circuit is not saturated is incident, corresponding to a pixel region indicated by the pixel cells 303 in FIG. 1. Since outputs of the amplification circuits of the columns of the region 403 of the same row as the region 402 are sharply changed as a result of change in the electric potential of the power supply and/or GND line as affected by the region 402 where the amplification circuit is saturated, an image in the form of a stripe results along a transverse direction as shown in FIG. 2.

SUMMARY OF THE INVENTION

In a first aspect of the invention, there is provided a solid-state imaging device including: a pixel section having two-dimensionally arranged pixels, each pixel containing a photoelectric conversion device for converting a light signal into signal electric charges, an electric charge retaining section for retaining the signal electric charges, an amplification section for amplifying and outputting as pixel signal the signal electric charges retained at the electric charge retaining section, and a reset section connected at one end thereof to a power supply and at the other end to the electric charge retaining section where a connection between the one end and the other end is controlled by a reset control signal applied on a control terminal thereof, the pixel section having a vertical signal line onto which the signal from the pixel is outputted and having a constant current supply connected at one end thereof to the vertical signal line and grounded at the other end for supplying a constant current to the vertical signal line; a CDS circuit for outputting the pixel signal corresponding to the light signal having a noise suppressed by computing a difference between a first signal outputted onto the vertical signal line from the pixel immediately after applying a first electric potential for connecting the one end and the other end of the reset section to the control terminal and a second signal outputted from the pixel corresponding to the signal electric charges; and a reset section control section taking an electric potential of the reset control signal at the time of cutting off the connection between the one end and the other end of the reset section as a second electric potential, for applying a third electric potential being an intermediate electric potential between the first electric potential and the second electric potential to the control terminal between a timing of outputting the first signal and a timing of outputting the second signal.

In a second aspect of the invention, the reset section control section in the solid-state imaging device according to the first aspect applies the third electric potential in a period during which the pixel is outputting the first signal.

In a third aspect of the invention, the reset section control section in the solid-state imaging device according to the first aspect applies the third electric potential in a period during which the pixel is outputting the second signal.

In a fourth aspect of the invention, the solid-state imaging device according to the third aspect further including a gain variable amplifier connected between the vertical signal line and the CDS circuit for amplifying the signal from the pixel, wherein the reset section control section makes variable a level of the third electric potential in accordance with a gain of the gain variable amplifier.

In a fifth aspect of the invention, the reset section control section in the solid-state imaging device according to the first aspect is capable of varying a level of the third electric potential, and makes the level of the third electric potential be different between a first period during which the pixel is outputting the first signal and a second period during which the pixel is outputting the second signal.

In a sixth aspect of the invention, the solid-state imaging device according to the fifth aspect further including a gain variable amplifier connected between the vertical signal line and the CDS circuit for amplifying the signal from the pixel, wherein the reset section control section during the second period makes variable the level of the third electric potential in accordance with a gain of the gain variable amplifier.

DESCRIPTION OF THE PREFERRED EMBODIMENTS

Some embodiments of the solid-state imaging device according to the invention will be described below with reference to the drawings.

Embodiment 1

Figure 1:
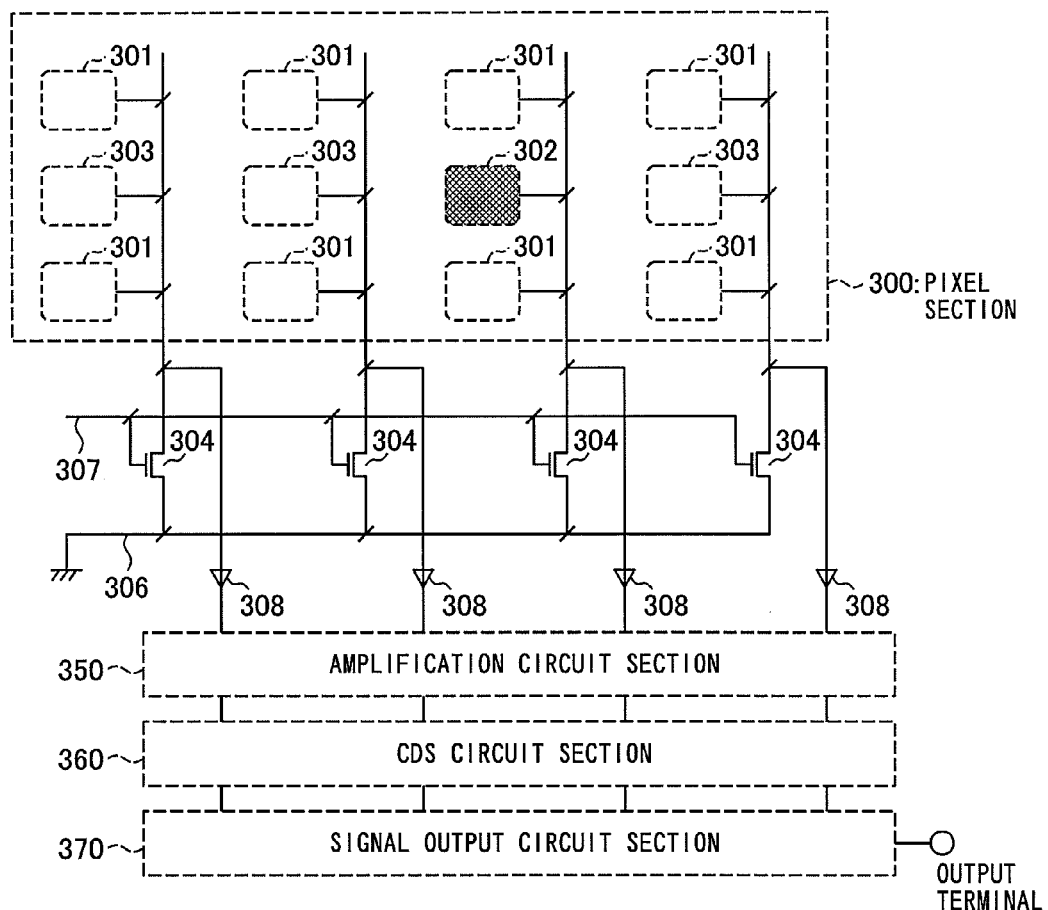
FIG. 1 is a block diagram schematically showing construction of a prior-art MOS solid-state imaging device.
Figure 2:
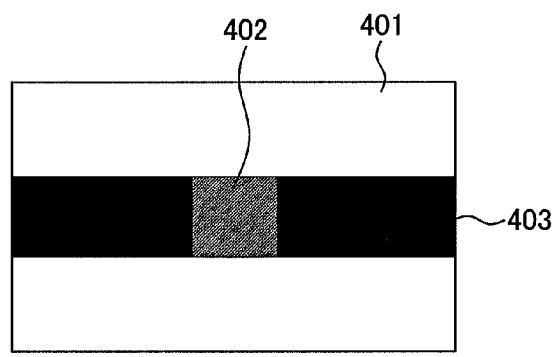
FIG. 2 typically illustrates the manner of effect on image when a sharp output change in the amplification circuit occurs due to incidence of an intense light in the prior-art example shown in FIG. 1.
Figure 3:
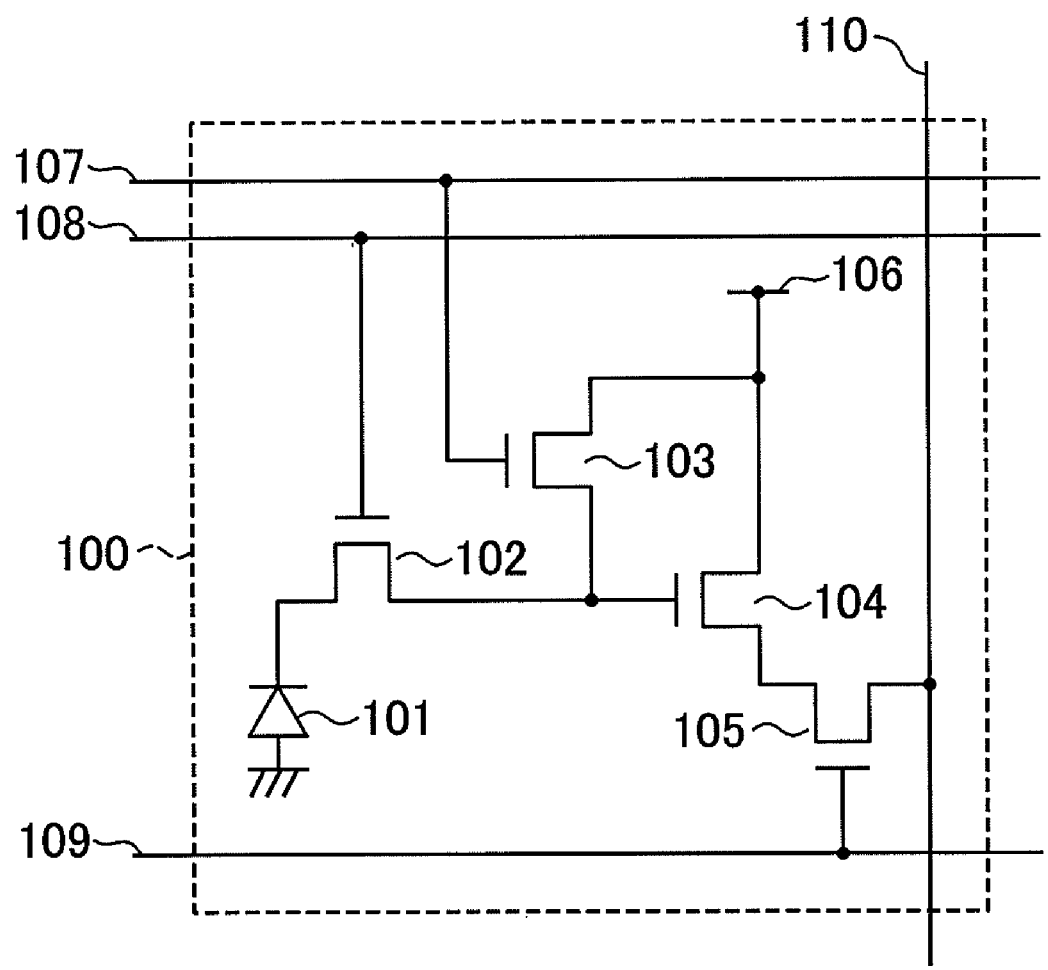
FIG. 3 is a circuit diagram showing a pixel construction of unit pixel in a first embodiment of the solid-state imaging device according to the invention.

A first embodiment of the solid-state imaging device according to the invention will now be described. This embodiment corresponds to a respective embodiment of the first and second aspects of the invention. FIG. 3 is a circuit diagram showing the construction of a pixel used in the solid-state imaging device according to the first embodiment. Referring to FIG. 3, denoted by 100 is a unit pixel a plurality of which, when arranged into a two-dimensional matrix, forms a pixel section to acquire an image information. 101 is a photodiode for performing photoelectric conversion, and 104 is an amplification transistor for converting photo-generated electric charges occurring at the photodiode 101 into a voltage for example by means of a pn junction capacitor or a gate capacitor so as to amplify and read it out, a gate terminal of the amplification transistor forming an input section. Thus an electric charge retaining section can be a pn junction capacitance or a gate capacitance of amplification transistor 104. Also shown are: a transfer transistor 102 for transferring the photo-generated electric charges occurring at the photo diode 101 to the input section of the amplification transistor 104; a reset section is shown by reset transistor 103 for resetting the input section of the amplification transistor 104 and the photodiode 101; and a select transistor 105 for selecting the pixel to transmit an output of the amplification transistor 104 to a vertical signal line 110. These components but the photodiode 101 are shielded from light.

106 is a pixel power supply line which is to supply power commonly to all pixels and is electrically connected to a drain terminal of the amplification transistor 104 and to a drain terminal of the reset transistor 103. 107 is a row reset line for resetting pixels corresponding to one row, which is electrically connected respectively to a gate terminal of the reset transistor 103 of the pixels corresponding to one row. 108 is a row transfer line for transferring photo-generated electric charges of pixels corresponding to one row to the gate terminal of the amplification transistor 104 of the respective pixels, which is electrically connected respectively to the gate terminal of the transfer transistors 102 corresponding to one row. 109 is a row select line for selecting pixels corresponding to one row, which is electrically connected respectively to the gate terminal of the select transistors 105 corresponding to one row.

With such a pixel construction, a photoelectric conversion function, a reset function, a memory function, an amplification/read function and a select function are achieved.

Figure 4:
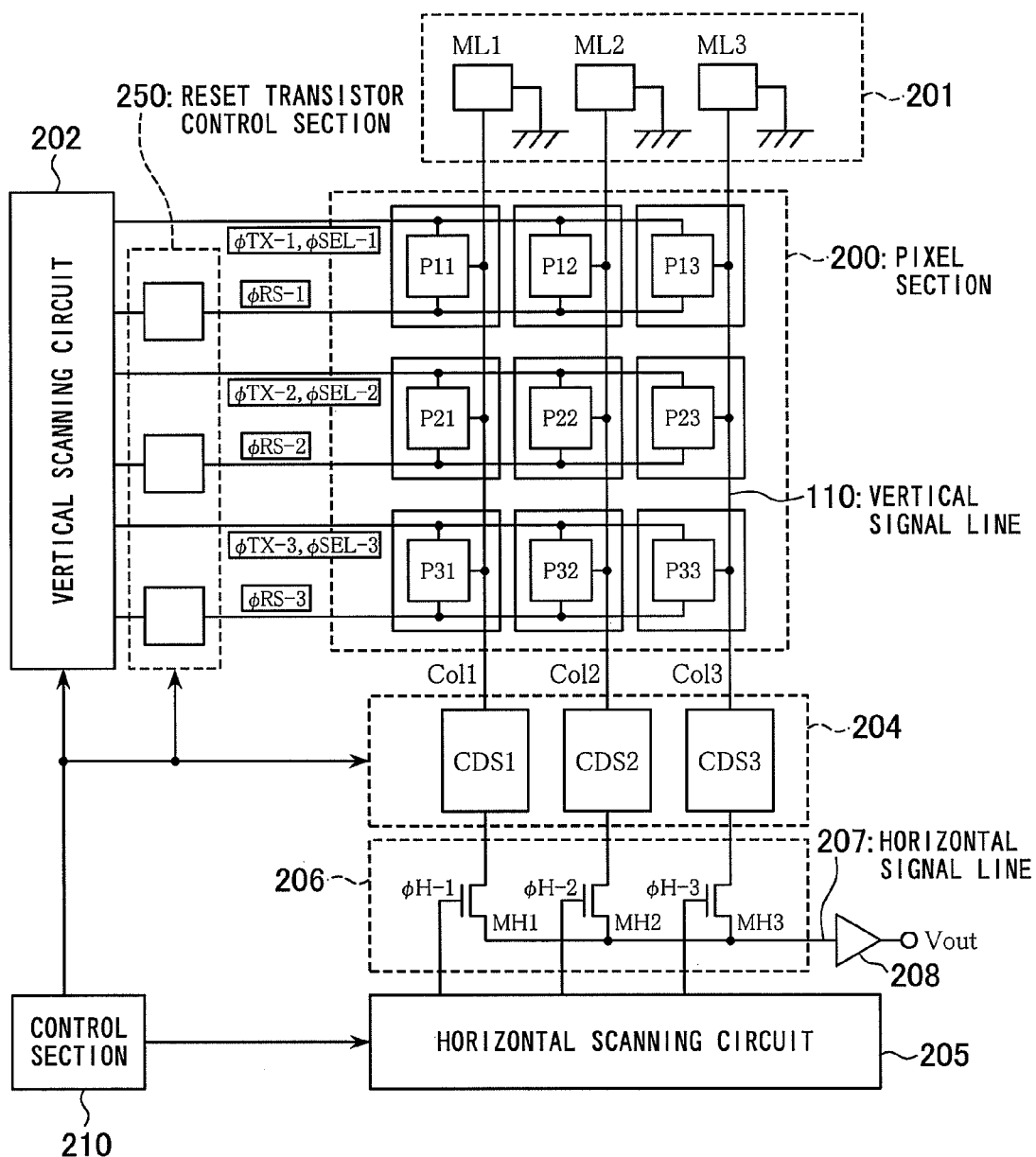
FIG. 4 is a block diagram showing a construction of the solid-state imaging device according to the first embodiment.

FIG. 4 typically shows a fundamental construction of the solid-state imaging device according to the first embodiment. Referring to FIG. 4, denoted by 200 is a pixel section where unit pixels 100 are arranged into a two-dimensional matrix. The unit pixels 100 in this case are shown for ease of explanation as those arranged corresponding to 3 rows by 3 columns. It should be noted that the unit pixels are denoted by P11 to P33. 202 is a vertical scanning circuit for performing a row selection and 250 is a reset transistor control section, which selects pixels by the unit of row and causes the pixel signals of the selected row to be outputted onto the vertical signal line 110 which is provided for each column. More specifically, it is to transmit a row select pulse φSEL, a row reset pulse φRS, and a row transfer pulse φTX respectively to the row select line 109, the row reset line 107, and the row transfer line 108 of each pixel P11 to P33. While, in FIG. 4, lines for transmitting the row select pulse φSEL and the row transfer pulse φTX to each row are indicated by one line, these are actually provided independently from each other. The reset transistor control section 250 is to control the level of the row reset pulse φRS to the reset transistor of the pixel by the unit of row.

201 is a current supply section, where current supplies ML1, ML2, ML3 provided for each column and the vertical signal line 110 as explained in FIG. 3 are respectively electrically connected so as to form a source follower circuit column by column with the amplification transistor 104 of each pixel and the current supply ML1 to ML3. The current supply ML1 to ML3 in this case has a function for causing a flow of constant bias current. 204 is a CDS circuit section, where a correlated double sampling (CDS) is effected of the pixel signals outputted from the above described source follower circuit respectively by CDS circuit CDS1, CDS2, CDS3 that is provided column by column. It then stores a signal processing result after performing such signal processing as the removing of offset variance of fixed pattern noise of pixel.

205, a horizontal scanning circuit for selecting column, is to sequentially output horizontal scanning pulses φH-j (j=1, 2, 3). 206 represents a horizontal select switch section consisting of horizontal select switches MH1, MH2, MH3, which is to transmit to a horizontal signal line 207 the signal processing result stored at the CDS circuit section 204 in accordance with the horizontal scanning pulse φH-j. 208 is an amplifier for amplifying and outputting to the outside the signal processing result stored at the CDS circuit section 204 transmitted to the horizontal signal line 207. The operations of the vertical scanning circuit 202, the CDS circuit section 204, the horizontal scanning circuit 205, and the reset transistor control section 250 are controlled by a control section 210.

A drive operation of the solid-state imaging device according to the present embodiment will now be described by way of a timing chart in FIG. 5. When a vertical scanning pulse of the first row is outputted from the vertical scanning circuit 202, the pixels of the first row become drivable. More particularly, for the pixels of the first row, the row select pulse φSEL is transmitted as φSEL-1 through the row select line 109 to the gate terminal of the select transistor 105 of the pixels of the first row, the row reset pulse φRS as φRS-1 through the row reset line 107 to the gate terminal of the reset transistor 103 of the pixels of the first row, and the transfer pulse φTX as φTX-1 through the row transfer line 108 to the gate terminal of the transfer transistor 102 of the pixels of the first row.

The operation in a period Tv will first be described. When the row select pulse φSEL-1 attains "H" level, an output of the amplification transistor 104 is transmitted to the vertical signal line 110. In other words, a period of performing signal reading and signal processing is started. Next, when the row reset pulse φRS-1 attains "H" level, the input section of the amplification transistor 104 is reset to a level of the pixel power supply VDD. Subsequently, the row reset pulse φRS-1 is brought to a medium level, and a reset level output outputted from the amplification transistor 104 at this time is sampled at the CDS circuit section 204. A sampling period of the reset level output is indicated by "tr" in the figure. After that, the row reset pulse φRS-1 is brought to "L" level.

Next, the row transfer pulse φTX-1 is driven to "H" level to transfer photo-generated electric charges accumulated at the photodiode 101 to the gate terminal of the amplification transistor 104. The row transfer pulse φTX-1 then is brought to "L" level to perform the sampling again at the CDS circuit section 204 of the signal level output outputted at this time. A sampling period of the signal output is indicated by "ts" in the figure.

Subsequently, a differential processing between the sampled reset level output and signal level output is effected at the CDS circuit section 204, and signals after the differential processing are stored respectively at each CDS circuit CDS1, CDS2, CDS3. The row select signal φSEL-1 then is brought to "L" level so that the period of performing signal reading and signal processing is ended. After that, the row reset pulse φRS-1 and the row transfer pulse φTX-1 are driven to "H" level to reset the photodiode 101, whereby an accumulation of the photo-generated electric charges is started at the photodiode 101.

The operation in a period Th will next be described. When the horizontal scanning pulses φH-1, φH-2, and φH-3 are sequentially outputted from the horizontal scanning circuit section 205, the signals after differential processing stored at each CDS circuit CDS1, CDS2, CDS3 of the CDS circuit section 204 are sequentially read out onto the horizontal signal line 207 respectively through each horizontal select switch MH1, MH2, and MH3 of the horizontal select switch section 206. The signals read out onto the horizontal signal line 207 are amplified at the output amplifier section 208 and are outputted to the outside. The signals outputted to the outside are indicated by Vout in FIGS. 4 and 5. At this time, a suitable bias current is being supplied to the output amplifier section 208 in accordance with a signal band.

The signals of the pixels corresponding to one row are read out with the above operation. The signals of all pixels of the pixel section 200 can be read out by sequentially performing this operation from the first row to the third row. In particular, the pixel signals of the pixels P1 to P33 of the light receiving pixel section 200 are sequentially outputted as Vout from the output amplifier section 208. The above period constitutes one frame period Tf which, in this description, is an accumulation period of photo-generated electric charges of the photodiode 101.

Figure 5:
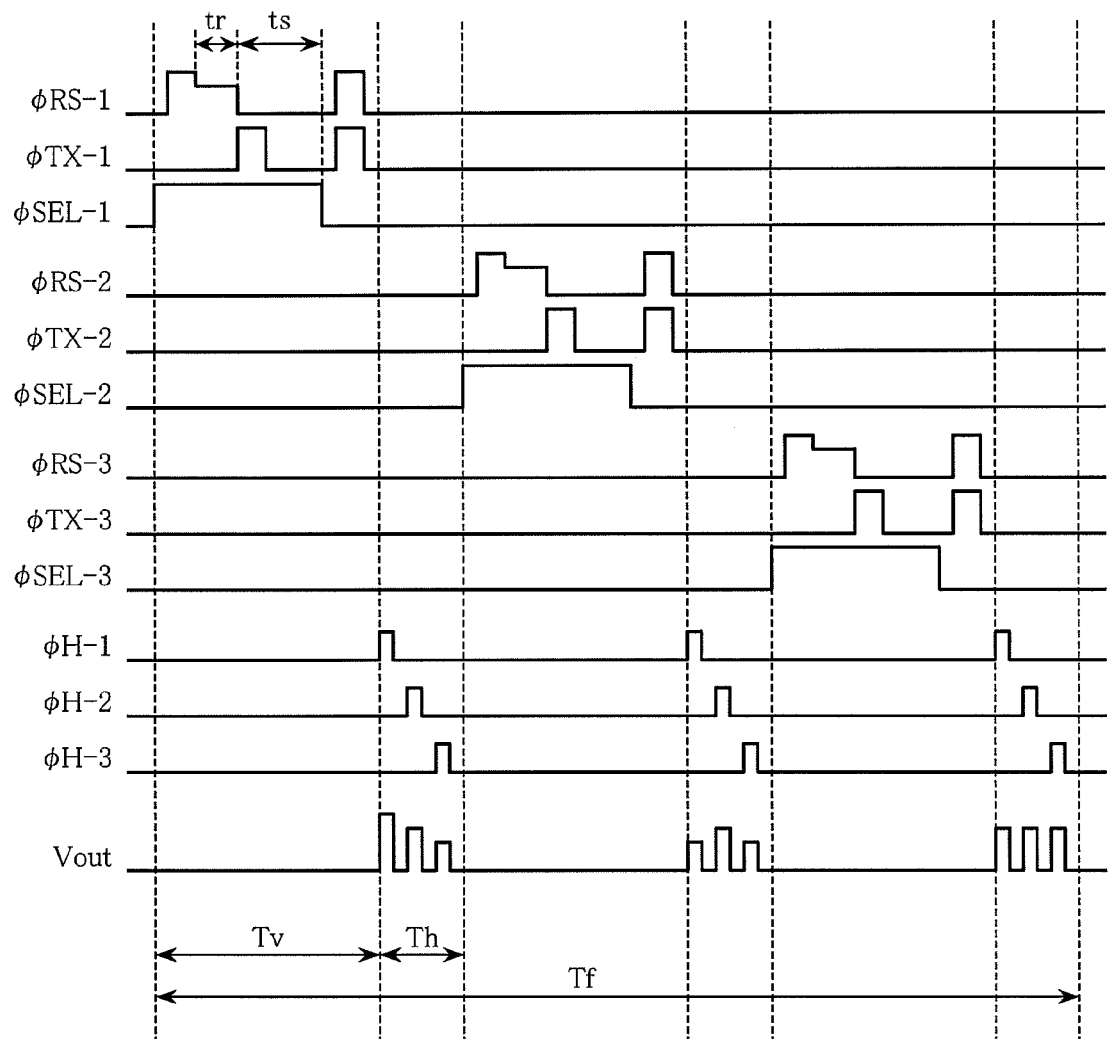
FIG. 5 is a timing chart for explaining an operation of the first embodiment shown in FIG. 4.

When the solid-state imaging device is caused to operate at the drive timings shown in FIG. 5, the input section of the amplification transistor 104 is clipped by a value corresponding to the medium level applied on the gate of the reset transistor 103 in the sampling period of reset level output (period indicated by "tr" in FIG. 5). Specifically, supposing Vrs(M) as the medium level applied on the gate of the reset transistor 103 and Vthr as a threshold voltage of the reset transistor 103, the clip voltage is attained substantially as (Vrs(M)–Vthr). Accordingly, when an intense light is incident on the solid-state imaging device according to the present embodiment, the input section of the amplification transistor 104 does not fall below the above described clip voltage in the period during which the input section of the amplification transistor 104 within pixel is reset and the reset level output outputted from the amplification transistor 104 is being sampled at the CDS circuit section 204. This therefore prevents the black sun phenomenon where dynamic range is suppressed as the reset level output is changed of the input section of the amplification transistor 104 so that output of the image signal is lowered as a result after CDS operation.

Figure 6:
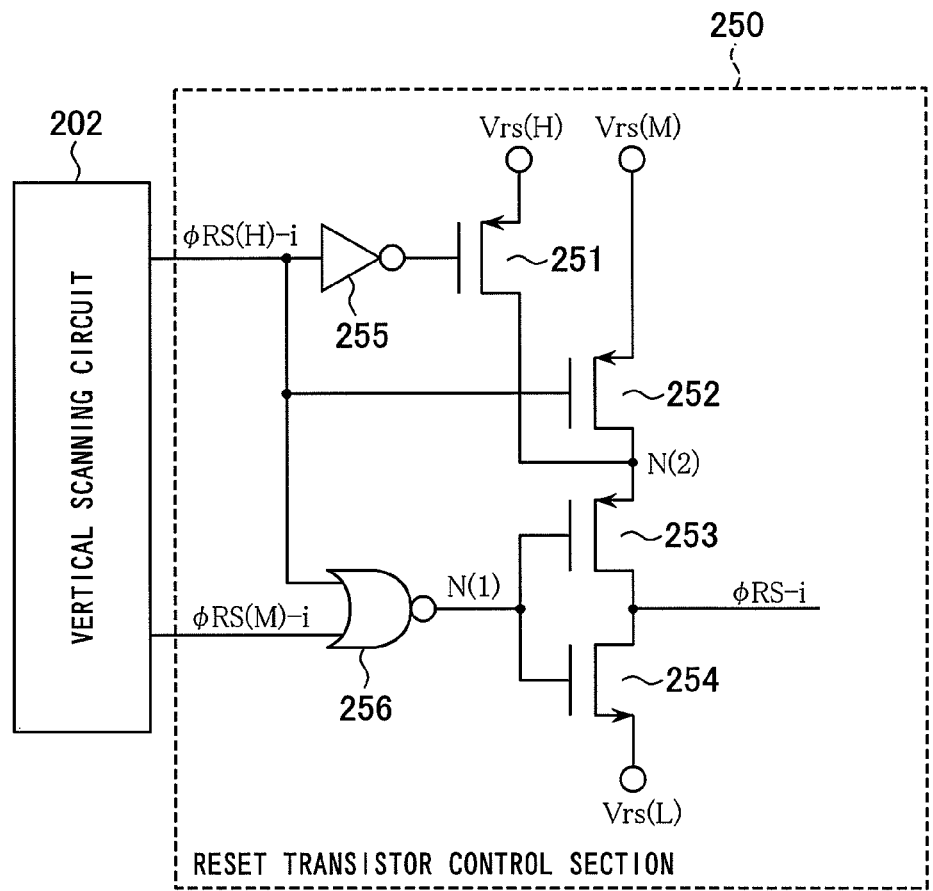
FIG. 6 is a circuit diagram showing a construction of a reset transistor control section in the first embodiment shown in FIG. 4.

FIG. 6 specifically shows a circuit construction of the reset transistor control section 250 for applying a ternary-level control signal on the gate of the reset transistor 103 of each pixel. The reset transistor control section 250, or simply reset control section, includes PchMOS transistors 251, 252, 253, a NchMOS transistor 254, an inverter 255, and a NOR circuit 256, which are connected as shown. Inputted to it from the vertical scanning circuit 202 are a signal φRS(H)-i in the period when the row reset pulse φRS-i attains "H" level and a signal φRS(M)-i of a period when the same attains the medium level. Vrs(H) in FIG. 6 indicates "H" level of the row reset pulse φRS-i, Vrs(M) the medium level, and Vrs(L) "L" level, respectively.

Figure 7:
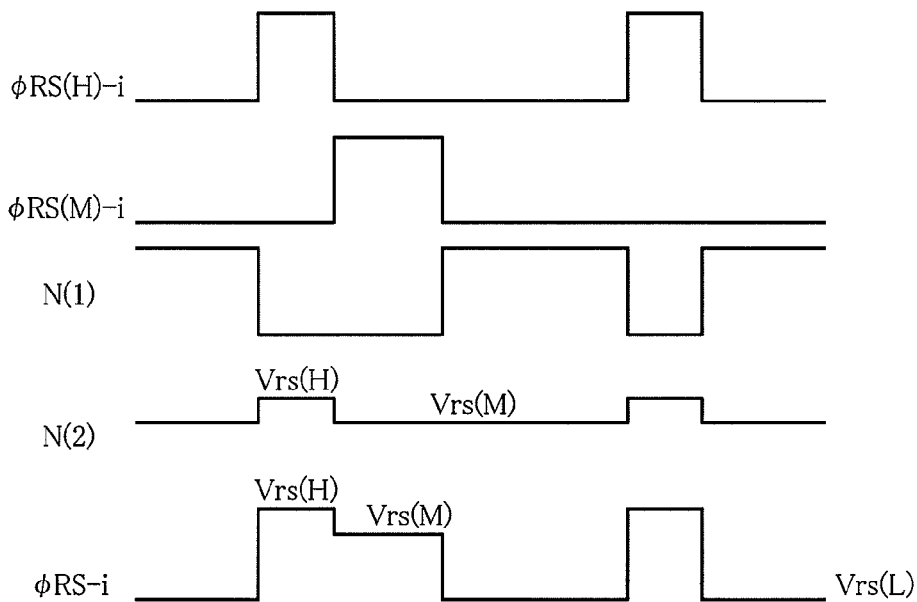
FIG. 7 is a timing chart for explaining an operation of the reset transistor control section shown in FIG. 6.

FIG. 7 is a timing chart for explaining operation of the reset transistor control section 250 shown in FIG. 6. An intermediate node N(1) attains "L" level in period where the row reset pulse φRS-i becomes "H" level or the intermediate level, and the level of an intermediate node N(2) results in "H" level Vrs(H) and the medium level Vrs(M) of the row reset pulse φRS-i. The output φRS-i of the reset transistor control section 250 having a circuit construction as shown in FIG. 6 thereby becomes a ternary signal having the values of Vrs(H), Vrs(M), and Vrs(L) as shown in FIG. 7.

As has been described above, the solid-state imaging device of the present embodiment is capable of suppressing the black sun phenomenon even when an intense light enters the solid-state imaging device. It is to be noted that various modifications and alterations of the construction in the above first embodiment are naturally possible without departing from its object.

Embodiment 2

Figure 8:
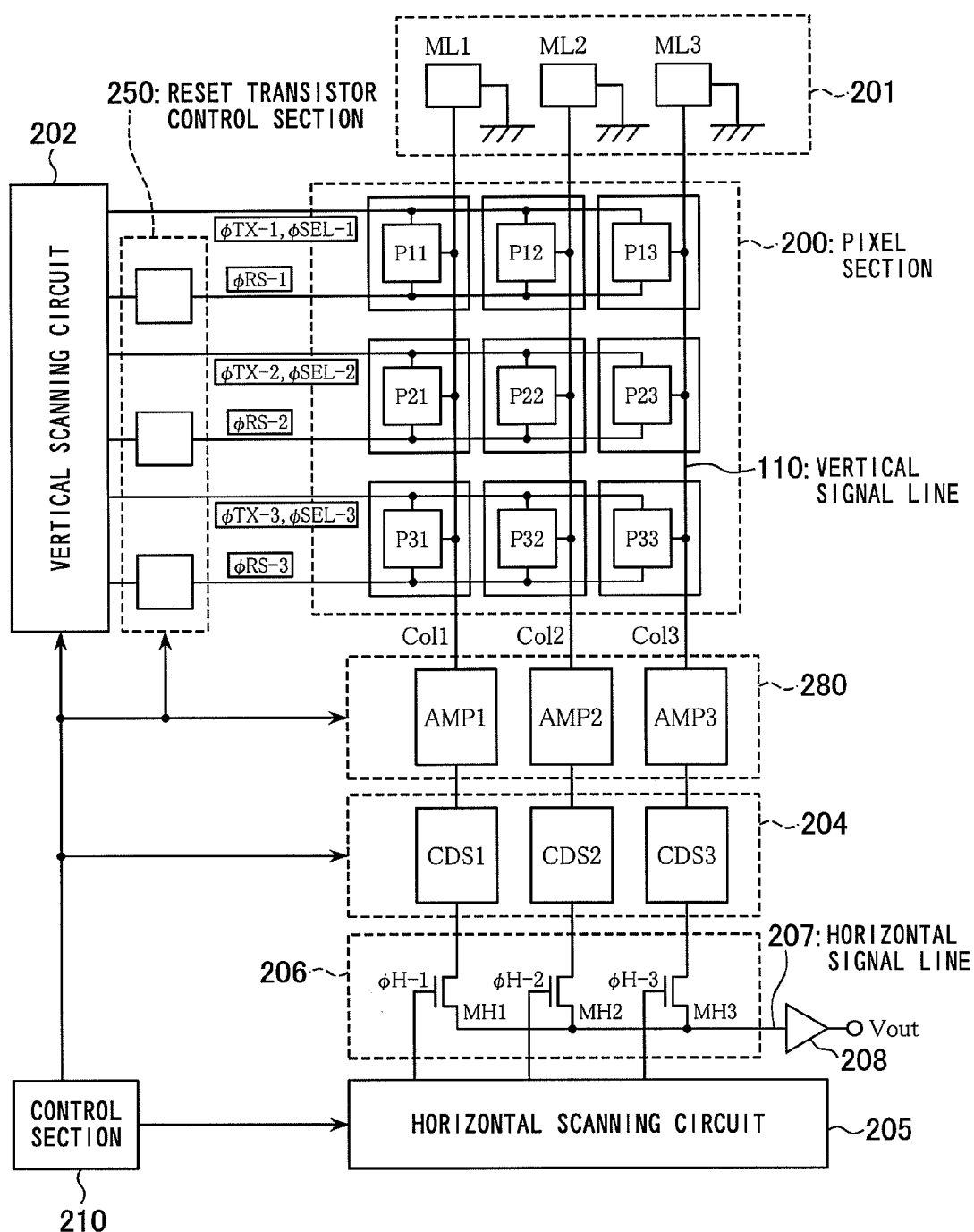
FIG. 8 is a block diagram showing a construction of the solid-state imaging device according to a second embodiment of the invention.

A second embodiment of the solid-state imaging device according to the invention will now be described. This embodiment corresponds to an embodiment of the first, third and fourth aspect of the invention. FIG. 8 typically shows a fundamental construction of the solid-state imaging device according to the second embodiment. In this embodiment, an AMP circuit section 280 consisting of gain variable amplification circuits AMP1, AMP2, AMP3 is provided between the pixel section 200 and the CDS circuit section 204 for performing correlated double sampling (CDS) in the solid-state imaging device of the first embodiment shown in FIG. 4. The AMP circuit section 280 is also controlled by the control section 210. The construction of the rest is similar to the first embodiment shown in FIG. 4 and will not be described.

Figure 9:
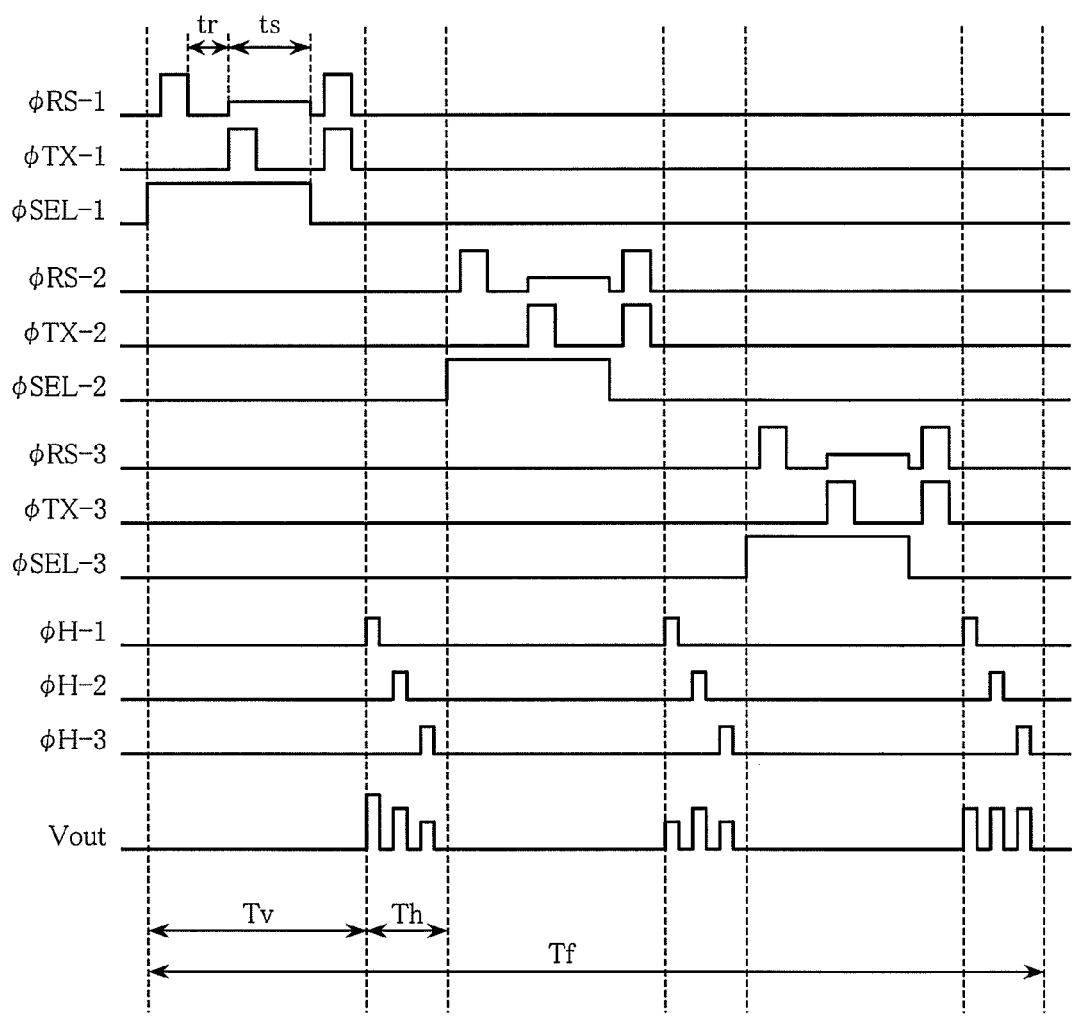
FIG. 9 is a timing chart for explaining an operation of the second embodiment shown in FIG. 8.

FIG. 9 is a timing chart for explaining operation of the solid-state imaging device according to the present embodiment. The operation will be described below with using this timing chart. When a vertical scanning pulse of the first row is outputted from the vertical scanning circuit 202, the pixels of the first row become drivable. More particularly, for the pixels of the first row, the row select pulse φSEL is transmitted as φSEL-1 through the row select line 109 to the gate terminal of the select transistor 105 of the pixels of the first row, the row reset pulse φRS is transmitted as φRS-1 through the row reset line 107 to the gate terminal of the reset transistor 103 of the pixels of the first row, and the transfer pulse φTX is transmitted as φTX-1 through the row transfer line 108 to the gate terminal of the transfer transistor 102 of the pixels of the first row.

The operation in a period Tv will first be described. When the row select pulse φSEL-1 attains "H" level, an output of the amplification transistor 104 is transmitted to the vertical signal line 110. In other words, a period of performing signal reading and signal processing is started. Next, when the row reset pulse φRS-1 attains "H" level, the input section of the amplification transistor 104 is reset to a level of the pixel power supply VDD. Subsequently, the row reset pulse φRS-1 is brought to "L" level, and a reset level output outputted from the amplification transistor 104 at this time is sampled at the CDS circuit section 204 through the AMP circuit section 280. A sampling period of the reset level output is indicated by "tr" in FIG. 9.

Next, the row transfer pulse TX-1 is driven to "H" level to transfer photo-generated electric charges accumulated at the photodiode 101 to the gate terminal of the amplification transistor 104, and at the same time the row reset pulse φRS-1 is brought to a medium level. The row transfer pulse φTX-1 then is brought to "L" level to amplify at the AMP circuit section 280 the signal level output outputted at this time. The amplified signal level output then is subjected to sampling again at the CDS circuit section 204, and the reset pulse φRS-1 is brought to "L" level after the sampling is ended. A sampling period of the signal output is indicated by "ts" in FIG. 9.

Subsequently, a differential processing between the sampled reset level output and signal level output is effected at the CDS circuit section 204, and signals after the differential processing are stored respectively at each CDS circuit CDS1, CDS2, CDS3. The row select signal φSEL-1 then is brought to "L" level so that the period of performing signal reading and signal processing is ended. After that, the row reset pulse φRS-1 and the row transfer pulse φTX-1 are driven to "H" level to reset the photodiode 101, whereby an accumulation of the photo-generated electric charges is started at the photodiode 101.

The operation in a period Th will next be described. When the horizontal scanning pulses φH-1, φH-2, and φH-3 are sequentially outputted from the horizontal scanning circuit section 205, the signals after differential processing stored at each CDS circuit CDS1, CDS2, CDS3 of the CDS circuit section 204 are sequentially read out onto the horizontal signal line 207 respectively through horizontal select switches MH1, MH2, and MH3 of the horizontal select switch section 206. The signals read out onto the horizontal signal line 207 are amplified at the output amplifier section 208 and are outputted to the outside. The signals outputted to the outside are indicated by Vout in FIGS. 8 and 9. At this time, a suitable bias current is being supplied to the output amplifier section 208 in accordance with a signal band.

The signals of the pixels corresponding to one row are read out with the above operation. The signals of all pixels of the pixel section 200 can be read out by sequentially performing this operation from the first row to the third row. In particular, the pixel signals of the pixels P11 to P33 of the light receiving pixel section 200 are sequentially outputted as Vout from the output amplifier section 208. The above period constitutes one frame period Tf which, in this description, is an accumulation period of photo-generated electric charges at the photodiode 101.

When the solid-state imaging device is caused to operate at the drive timings shown in the timing chart of FIG. 9, the input section of the amplification transistor 104 is clipped by a value corresponding to the medium level applied on the gate of the reset transistor 103 in the sampling period of signal output (period indicated by "ts" in FIG. 9). Specifically, supposing Vrs(M') as the medium level applied on the gate of the reset transistor 103 and Vthr as a threshold voltage of the reset transistor 103, the clip voltage is attained substantially as (Vrs(M')−Vthr). Accordingly, when an intense light is incident on the solid-state imaging device of the present embodiment, the input section of the amplification transistor 104 does not fall below the above described clip voltage in the period during which the photo-generated electric charges accumulated at the photodiode 101 is transferred to the input section of the amplification transistor 104 and the signal level corresponding to such photo-generated electric charges is being sampled at the CDS circuit section 204 through the AMP circuit section 280. The AMP circuits AMP1, AMP2, AMP3 therefore can be kept in such a condition that none of these departs from their operation range. An occurrence of the transverse stripe phenomenon is thereby prevented, i.e. an effect on image resulting from a saturation of one column's AMP circuit by which the AMP circuits of other columns are affected so as to change their output.

It suffices that the medium level Vrs(M') applied on the gate of the reset transistor 103 be determined in accordance with the dynamic range of the AMP circuit section 280. In other words, since the input dynamic range is changed in accordance with the gain of the AMP circuit section 280, it suffices to correspondingly change the medium level Vrs(M').

Figure 10:
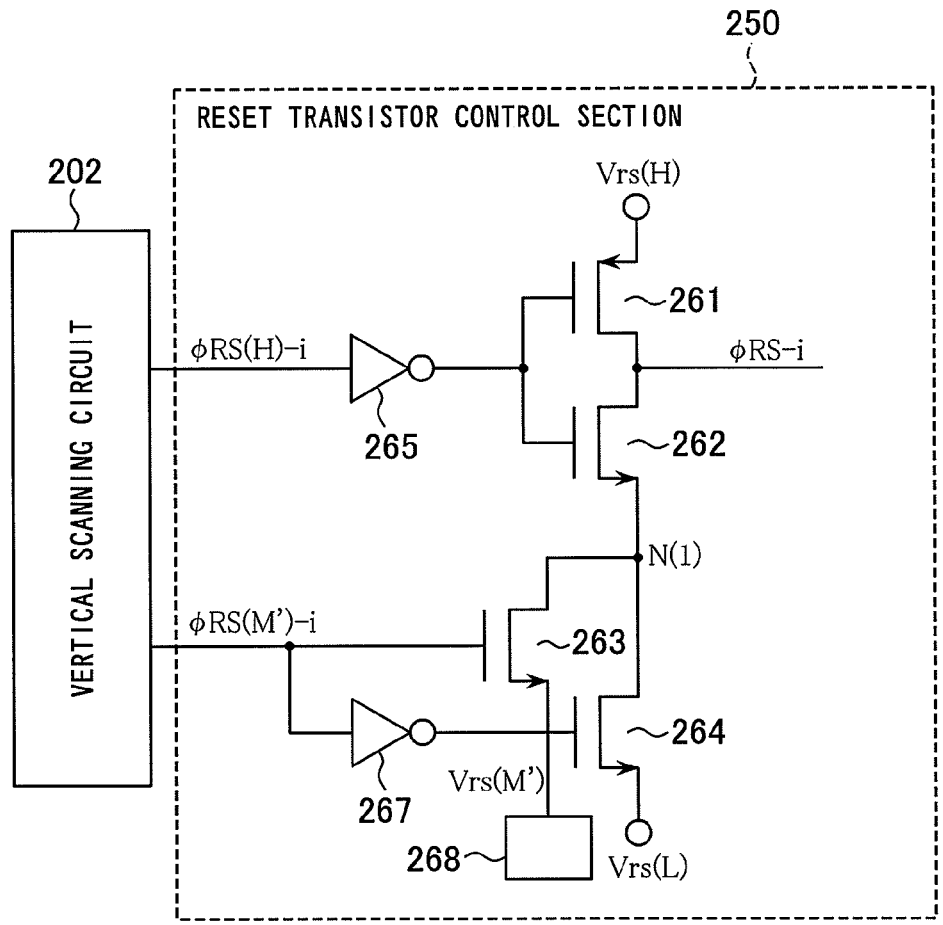
FIG. 10 is a circuit diagram showing a construction of a reset transistor control section in the second embodiment shown in FIG. 8.

FIG. 10 is a circuit diagram specifically showing the reset transistor control section 250 for applying a ternary-level control signal on the gate of the reset transistor 103. The reset transistor control section 250 includes a PchMOS transistor 261, NchMOS transistors 262, 263, 264, and inverters 265, 267, which are connected as shown. Inputted to it from the vertical scanning circuit 202 are a signal φRS(H)-i in the period when the row reset pulse φRS-i attains "H" level and a signal RS(M')-i in the period when the same attains the medium level. Vrs(H) in FIG. 10 indicates "H" level of the row reset pulse φRS-i, Vrs(M') the medium level, and Vrs(L) "L" level, respectively. Also referring to FIG. 10, 268 is a medium level control section which is to control the medium level Vrs(M') in accordance with gain of the AMP circuit section 280.

Figure 11:
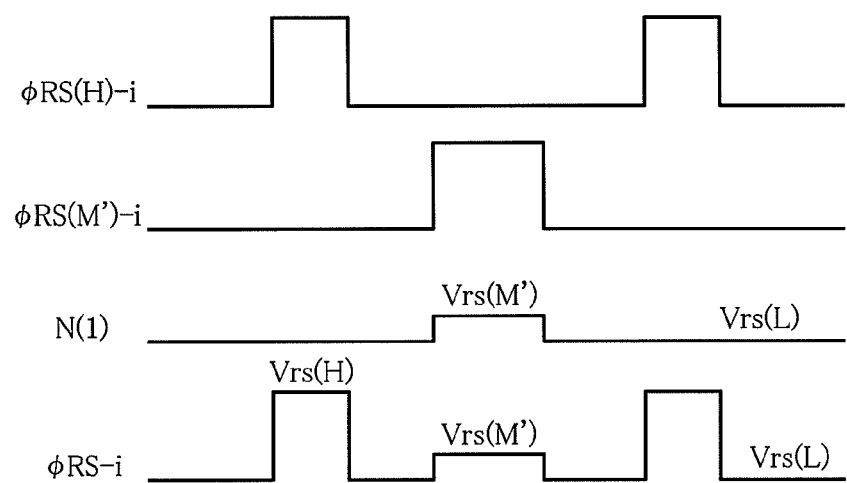
FIG. 11 is a timing chart for explaining an operation of the reset transistor control section shown in FIG. 10.

FIG. 11 shows a timing chart for explaining operation of the reset transistor control section 250 shown in FIG. 10. The level of an intermediate node N(1) becomes "L" level Vrs(L) and the medium level Vrs(M') of the row reset pulse φRS-i. The output RS-i of the reset transistor control section 250 having a circuit construction as shown in FIG. 10 is thereby attained as a ternary signal having the values of Vrs(H), Vrs(M'), and Vrs(L) as shown in FIG. 11.

As has been described, even when an intense light enters the solid-state imaging device, it is possible with the solid-state imaging device of the present embodiment to prevent a phenomenon where image is affected to cause a transverse stripe as a result of a saturation of one column's AMP circuit by which the AMP circuits of other columns are affected so as to change their output. It is to be noted that various modifications and alterations of the construction in the above second embodiment are naturally possible without departing from its object. For example, depending on the value of the medium level Vrs(M'), the circuit construction of the first embodiment shown in FIG. 6 can also be used as the construction of the reset transistor control section 250, and it is also possible that the medium level to be applied on the gate of the reset transistor 103 be applied from the "tr" period.

Embodiment 3

Figure 12:
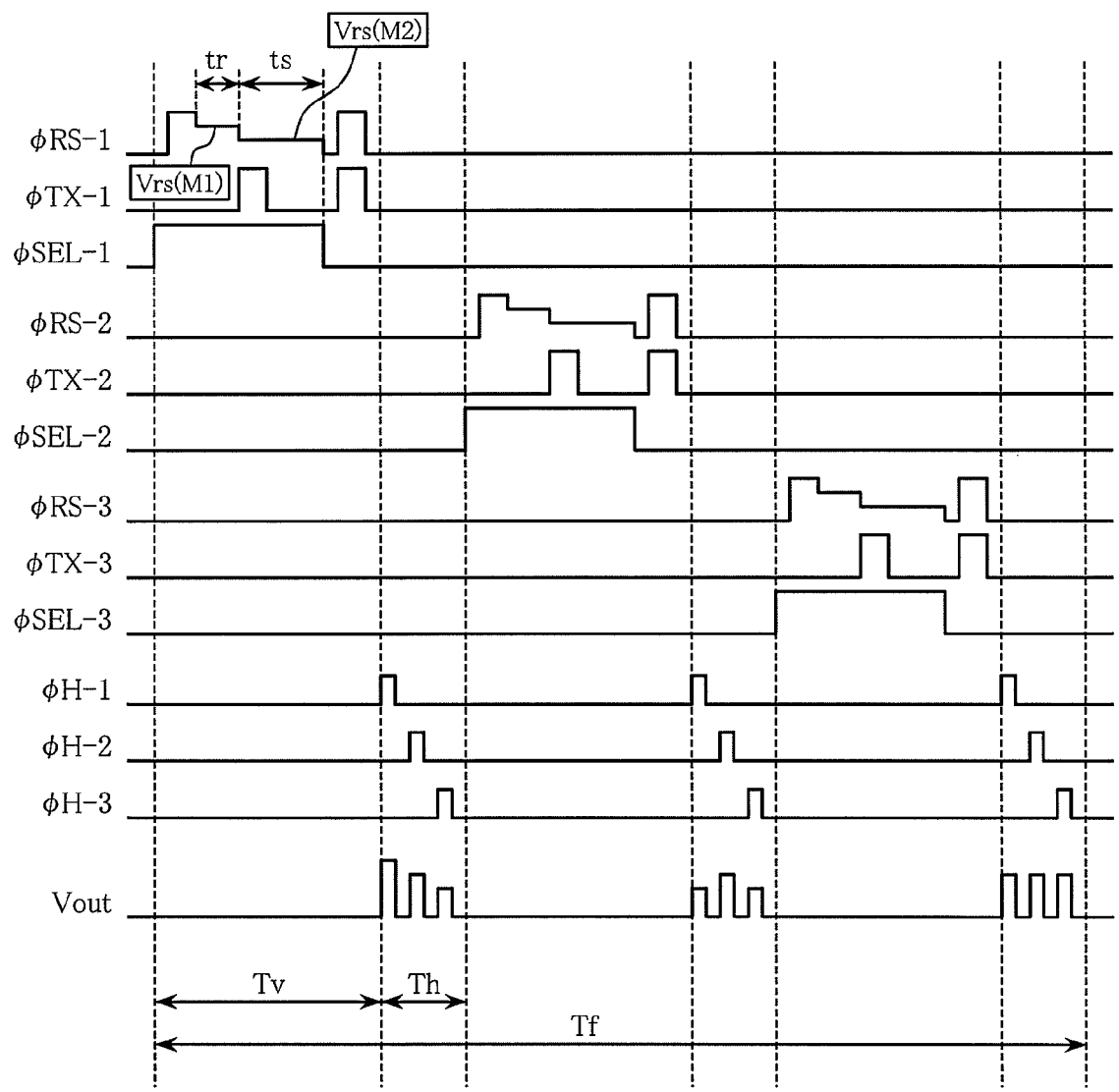
FIG. 12 is a timing chart for explaining an operation of the solid-state imaging device according to a third embodiment of the invention.

A third embodiment of the solid-state imaging device according to the invention will now be described. This embodiment corresponds to an embodiment of the first, fifth and sixth aspect of the invention. The construction of the solid-state imaging device itself according to this embodiment is identical to the second embodiment shown in FIG. 8, and its description by way of an illustration will be omitted. FIG. 12 is a timing chart for explaining operation of the solid-state imaging device according to the present embodiment. The operation will be described below with using this timing chart. When a vertical scanning pulse of the first row is outputted from the vertical scanning circuit 202, the pixels of the first row become drivable. More particularly, for the pixels of the first row, the row select pulse φSEL is transmitted as φSEL-1 through the row select line 109 to the gate terminal of the select transistor 105 of the pixels of the first row, the row reset pulse φRS is transmitted as φRS-1 through the row reset line 107 to the gate terminal of the reset transistor 103 of the pixels of the first row, and the row transfer pulse φTX is transmitted as φTX-1 through the row transfer line 108 to the gate terminal of the transfer transistor 102 of the pixels of the first row.

The operation in a period Tv will first be described. When the row select pulse φSEL-1 attains "H" level, an output of the amplification transistor 104 is transmitted to the vertical signal line 110. In other words, a period of performing signal reading and signal processing is started. Next, when the row reset pulse φRS-1 attains "H" level, the input section of the amplification transistor 104 is reset to a level of the pixel power supply VDD. Subsequently, the row reset pulse φRS-1 is brought to a first medium level Vrs(M1), and a reset level output outputted from the amplification transistor 104 at this time is sampled at the CDS circuit section 204 through the AMP circuit section 280. A sampling period of the reset level output is indicated by "tr" in FIG. 12.

Next, the row transfer pulse φTX-1 is driven to "H" level to transfer photo-generated electric charges accumulated at the photodiode 101 to the gate terminal of the amplification transistor 104, and at the same time the row reset pulse φRS-1 is brought to a second medium level Vrs(M2). The row transfer pulse φTX-1 then is brought to "L" level, and the signal level output outputted at this time is amplified at the AMP circuit section 280. The amplified signal level output then is subjected to sampling again at the CDS circuit section 204, and the row reset pulse φRS-1 is brought to "L" level after the sampling is ended. A sampling period of the signal output is indicated by "ts" in FIG. 12.

Subsequently, a differential processing between the sampled reset level output and signal level output is effected at the CDS circuit section 204, and signals after the differential processing are stored respectively at each CDS circuit CDS1, CDS2, and CDS3. The row select signal φSEL-1 then is brought to "L" level so that the period of performing signal reading and signal processing is ended. After that, the row reset pulse φRS-1 and the row transfer pulse φTX-1 are driven to "H" level to reset the photodiode 101, whereby an accumulation of the photo-generated electric charges is started at the photodiode 101.

The operation in a period Th will next be described. When the horizontal scanning pulses φH-1, φH-2, and φH-3 are sequentially outputted from the horizontal scanning circuit section 205, the signals after differential processing stored at each CDS circuit CDS1, CDS2, CDS3 of the CDS circuit section 204 are sequentially read out onto the horizontal signal line 207 respectively through horizontal select switches MH1, MH2, and MH3 of the horizontal select switch section 206. The signals read out onto the horizontal signal line 207 are amplified at the output amplifier section 208 and are outputted to the outside. The signals outputted to the outside are indicated by Vout in FIG. 12. At this time, a suitable bias current is being supplied to the output amplifier section 208 in accordance with a signal band.

The signals of the pixels corresponding to one row are read out with the above operation. The signals of all pixels of the pixel section 200 can be read out by sequentially performing this operation from the first row to the third row. In particular, the pixel signals of the pixels P11 to P33 of the light receiving pixel section 200 are sequentially outputted as Vout from the output amplifier section 208. The above period constitutes one frame period Tf which, in this description, is an accumulation period of photo-generated electric charges of the photodiode 101.

When the solid-state imaging device is caused to operate at the drive timings shown in FIG. 12, the input section of the amplification transistor 104 is clipped similarly to the first embodiment shown in FIG. 5 by a value corresponding to the first medium level Vrs(M1) applied on the gate of the reset transistor 103 in the sampling period of reset level output (period indicated by "tr" in FIG. 12). Specifically, supposing Vthr as a threshold voltage of the reset transistor 103, the clip voltage is attained substantially as (Vrs(M1)−Vthr). Accordingly, when an intense light is incident on the solid-state imaging device of the present embodiment, the input section of the amplification transistor 104 does not fall below the above described clip voltage in the period during which the input section of the amplification transistor 104 within pixel is reset and the reset level output outputted from the amplification transistor 104 is being sampled at the CDS circuit section 204. This therefore prevents the black sun phenomenon where dynamic range is suppressed as the reset level output is changed of the input section of the amplification transistor 104 so that output of the image signal is lowered as a result after CDS operation.

Further, in the sampling period of signal output (period indicated by "ts" in FIG. 12), the input section of the amplification transistor 104 is clipped similarly to the second embodiment shown in FIG. 9 by a value corresponding to the second medium level Vrs(M2) applied on the gate of the reset transistor 103. Specifically, the clip voltage is attained substantially as (Vrs(M2)−Vthr). For this reason, when an intense light is incident on the solid-state imaging device of the present embodiment, the input section of the amplification transistor 104 does not fall below the above described clip voltage in the period during which the photo-generated electric charges accumulated at the photodiode 101 is transferred to the input section of the amplification transistor 104 and the signal level corresponding to such photo-generated electric charges is being sampled at the CDS circuit section 204 through the AMP circuit section 280. The AMP circuits AMP1, AMP2, AMP3 therefore can be kept in such a condition that none of these departs from their operation range. It is thereby possible to prevent an effect on image resulting from a saturation of one column's AMP circuit by which the AMP circuits of other columns are affected so as to change their output, i.e. an occurrence of the transverse stripe phenomenon.

It suffices that the second medium level Vrs(M2) applied on the gate of the reset transistor 103 be determined in accordance with the dynamic range of the AMP circuit section 280. In other words, since the input dynamic range is changed in accordance with the gain of the AMP circuit section 280, it suffices to correspondingly change the second medium level Vrs(M2) similarly to the second embodiment.

Figure 13:
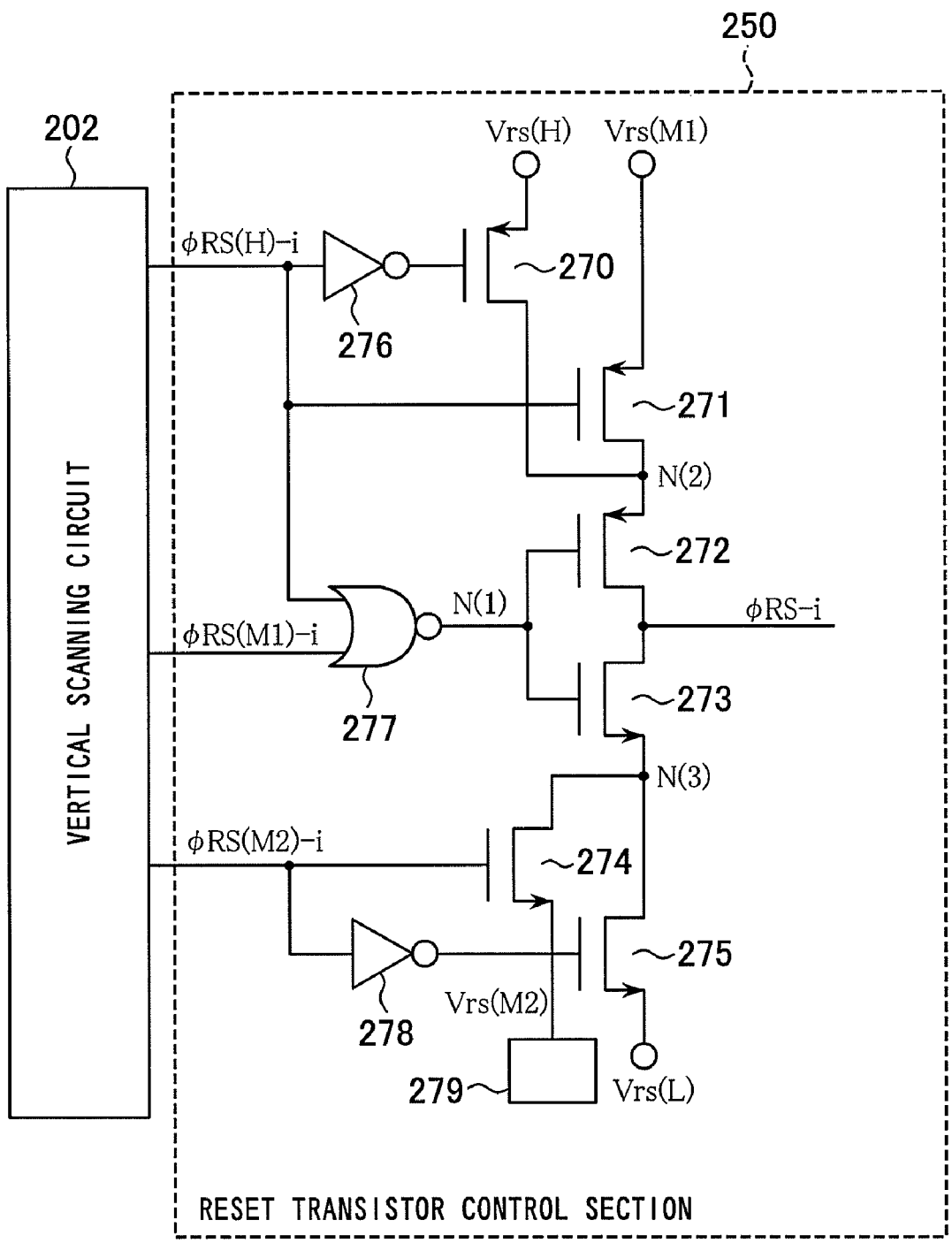
FIG. 13 is a circuit diagram showing a construction of a reset transistor control section in the third embodiment.

FIG. 13 specifically shows a circuit diagram of the reset transistor control section 250 for applying a control signal having 4-value levels on the gate of the reset transistor 103. The reset transistor control section 250 includes PchMOS transistors 270, 271, 272, NchMOS transistors 273, 274, 275, inverters 276, 278, and a NOR circuit 277, which are connected as shown. Inputted to it from the vertical scanning circuit 202 are a signal RS(H)-i in the period when "H" level of the row reset pulse φRS-i is attained, a signal φRS(M1)-i in the period when the first medium level Vrs(M1) is attained, and a signal φRS(M2)-i in the period when the second medium level Vrs(M2) is attained. Vrs(H) in FIG. 13 indicates "H" level of the row reset pulse φRS-i, Vrs(M1) and Vrs(M2) the first and second medium levels, and Vrs(L) "L" level, respectively. Also referring to FIG. 13, 279 is a medium level control section which is to control the second medium level Vrs(M2) in accordance with the gain of the AMP circuit section 280.

Figure 14:
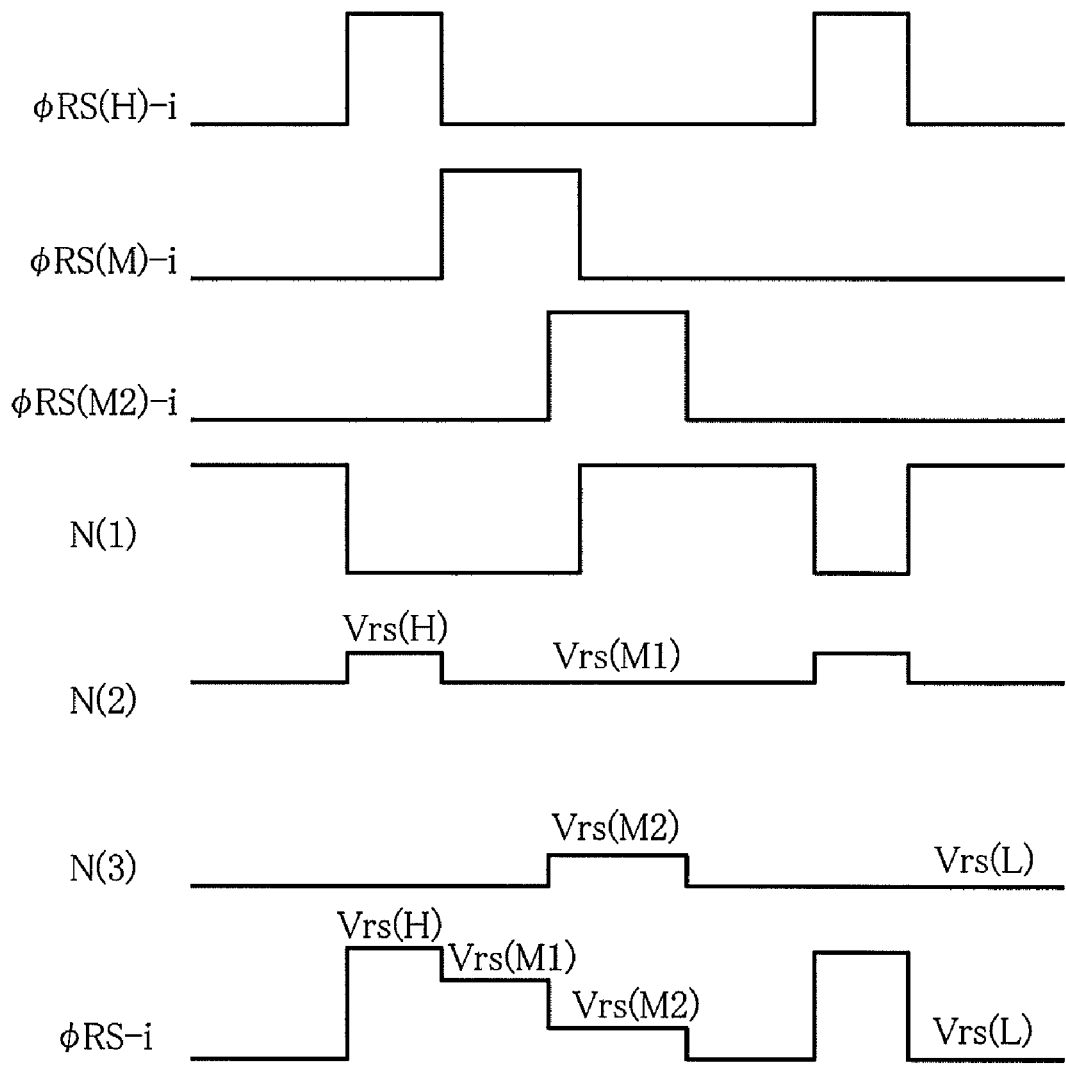
FIG. 14 is a timing chart for explaining an operation of the reset transistor control section shown in FIG. 13.

FIG. 14 shows a timing chart for explaining operation of the reset transistor control section 250 shown in FIG. 13. An intermediate node N(1) attains "L" level in the period when the row reset pulse φRS-i becomes "H" level or the first medium level Vrs(M1). Further, the level of an intermediate node N(2) becomes "H" level Vrs(H) and the first medium level Vrs(M1) of the row reset pulse φRS-i, and the level of an intermediate node N(3) becomes "L" level Vrs(L) and the second medium level Vrs(M2) of the row reset pulse φRS-i; accordingly, the output φRS-i of the reset transistor control section 250 having a circuit construction as shown in FIG. 13 is a signal having four values of Vrs(H), Vrs(M1), Vrs(M2), and Vrs(L).

As has been described, it is possible with the solid-state imaging device of the third embodiment to suppress the black sun phenomenon even when an intense light is incident on the solid-state imaging device. Also at the same time, it is possible to prevent an effect on image resulting from a saturation of one column's AMP circuit by which the AMP circuits of other columns are affected so as to change their output, i.e. an occurrence of the transverse stripe phenomenon. It is to be noted that various modifications and alterations of the construction of the above described third embodiment are naturally possible without departing from its object.

According to the first and second aspects of the invention as has been described by way of the above embodiments, in the period during which the pixel is outputting a reset level immediately after reset, a third potential between a first potential for connecting and a second potential for cutting off an electric charge retaining section and a power supply is applied at its control terminal of a reset section whereby clip operation is effected. The electric charge retaining section is thereby clipped to a certain level in the period during which the reset level is being outputted. Accordingly, since a change in the reset level is suppressed even when an intense light enters, the black sun phenomenon is prevented.

According to the third and fourth aspects, in the period during which the pixel is outputting a signal corresponding to signal electric charges, a third potential between a first potential for connecting and a second potential for cutting off an electric charge retaining section and a power supply is applied at its control terminal of a reset section whereby clip operation is effected. The electric charge retaining section is thereby clipped to a certain level in the period during which the signal corresponding to signal electric charges is being outputted. Accordingly, since the amplification circuit at a subsequent stage is not saturated even when an intense light enters, the transverse stripe phenomenon due to output change of the pixels in same one row is prevented.

According to the fifth and sixth aspects, in the period during which the pixel is outputting a reset level immediately after reset and in the period during which it is outputting a signal corresponding to signal electric charges, a third potential between a first potential for connecting and a second potential for cutting off an electric charge retaining section and a power supply is applied at its control terminal of a reset section whereby clip operation is effected. The electric charge retaining section is thereby clipped to a certain level in the period during which the reset level is being outputted and in the period during which the signal corresponding to signal electric charges is being outputted. Even when an intense light is incident, therefore, the black sun phenomenon and the transverse stripe phenomenon due to output change of the pixels in same one row are prevented.

What is claimed is:

1. A solid-state imaging device comprising:
a pixel section having two-dimensionally arranged pixels, each pixel containing a photoelectric conversion device for converting a light signal into signal electric charges, an electric charge retaining section for retaining said signal electric charges, an amplification section for amplifying and outputting as pixel signal said signal electric charges retained at said electric charge retaining section, and a reset section connected at one end thereof to a power supply and at the other end to said electric charge retaining section where a connection between said the one end and said the other end is controlled by a reset control signal applied on a control terminal thereof, said pixel section having a vertical signal line onto which the signal from said pixel is outputted and having a constant current supply connected at one end thereof to said vertical signal line and grounded at the other end for supplying a constant current to said vertical signal line;
a CDS circuit for outputting said pixel signal corresponding to said light signal having a noise suppressed by computing a difference between a first signal outputted onto said vertical signal line from said pixel immediately after applying a first electric potential for connecting the one end and the other end of said reset section to said control terminal and a second signal outputted from said pixel corresponding to said signal electric charges; and
a reset section control section taking an electric potential of said reset control signal at the time of cutting off said connection between the one end and the other end of said reset section as a second electric potential, for applying a third electric potential being an intermediate electric potential between said first electric potential and said second electric potential to said control terminal between a timing of outputting said first signal and a timing of outputting said second signal.

2. The solid-state imaging device according to claim 1, wherein said reset section control section applies said third electric potential in a period during which said pixel is outputting said first signal.

3. The solid-state imaging device according to claim 1, wherein said reset section control section applies said third electric potential in a period during which said pixel is outputting said second signal.

4. The solid-state imaging device according to claim 3 further comprising a gain variable amplifier connected between said vertical signal line and said CDS circuit for amplifying the signal from said pixel, wherein said reset section control section makes variable a level of said third electric potential in accordance with a gain of said gain variable amplifier.

5. The solid-state imaging device according to claim 1, wherein said reset section control section is capable of varying a level of said third electric potential, and makes the level of said third electric potential be different between a first period during which said pixel is outputting said first signal and a second period during which said pixel is outputting said second signal.

6. The solid-state imaging device according to claim 5 further comprising a gain variable amplifier connected between said vertical signal line and said CDS circuit for amplifying the signal from said pixel, wherein said reset section control section during said second period makes variable the level of said third electric potential in accordance with a gain of said gain variable amplifier.

* * * * *